United States Patent [19]
Kemker

[11] 3,991,427
[45] Nov. 16, 1976

[54] MIXING FAUCET

[76] Inventor: Karl Kemker, Seilerblick 31, 5860 Iserlohn, Germany

[22] Filed: Apr. 30, 1975

[21] Appl. No.: 573,061

[30] Foreign Application Priority Data
May 2, 1974 Germany............................ 2421197

[52] U.S. Cl................. 4/192; 137/625.17; 137/625.4; 137/625.26; 137/636; 4/191
[51] Int. Cl.² ..................... E03C 1/04; F16K 11/00
[58] Field of Search ................ 4/191, 192; 137/636, 137/625.17, 625.4, 630.17, 602, 603, 604, 625.26, 625.38, 625.49

[56] References Cited
UNITED STATES PATENTS

| | | | |
|---|---|---|---|
| 2,756,775 | 7/1956 | Hyde................................... | 137/636 |
| 2,851,057 | 9/1958 | Fraser.......................... | 137/625.4 X |
| 2,854,999 | 10/1958 | Moen............................. | 137/625.17 |
| 2,870,790 | 1/1959 | Jordan......................... | 137/625.4 X |
| 2,878,489 | 3/1959 | Graham ................................. | 4/192 |
| 2,978,917 | 4/1961 | Moen............................. | 137/636 X |
| 3,080,570 | 3/1963 | Weddendorf, Jr..................... | 4/192 |
| 3,374,957 | 3/1968 | Tyler.................................. | 4/192 X |

*Primary Examiner*—Henry K. Artis
*Attorney, Agent, or Firm*—Allison C. Collard

[57] ABSTRACT

A mixing faucet for sanitary installations comprising a sealed housing defining a mixing chamber and a water outlet, a mixing bushing having hot and cold outlet openings disposed radially in axial direction adjacent the mixing chamber and being mounted in the sealed housing, and a multistage pressure balanced control piston being displaceable within the mixing bushing and acting axially from an outside so as to open and close the water outlet. Two segment slides are positioned each between adjacent of three pistons of the control piston, the segments slides alternately opening and closing the outlet openings for the hot and cold water in the mixing busing, the hot and cold outlet openings discharging into the mixing chamber.

12 Claims, 12 Drawing Figures

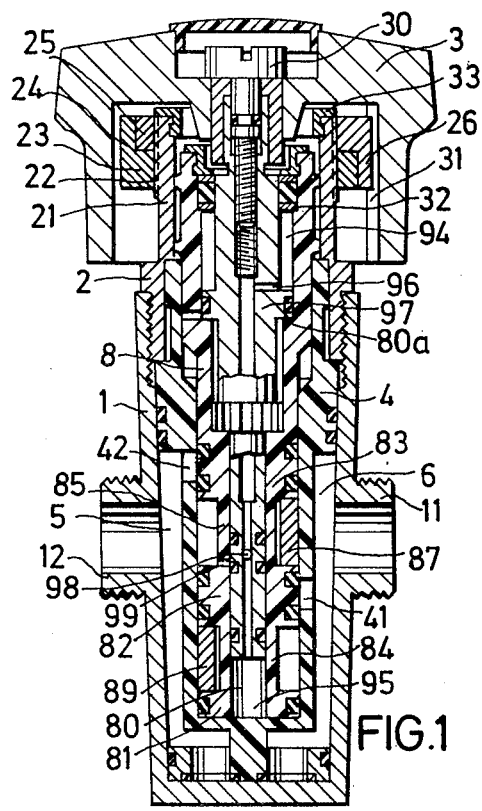
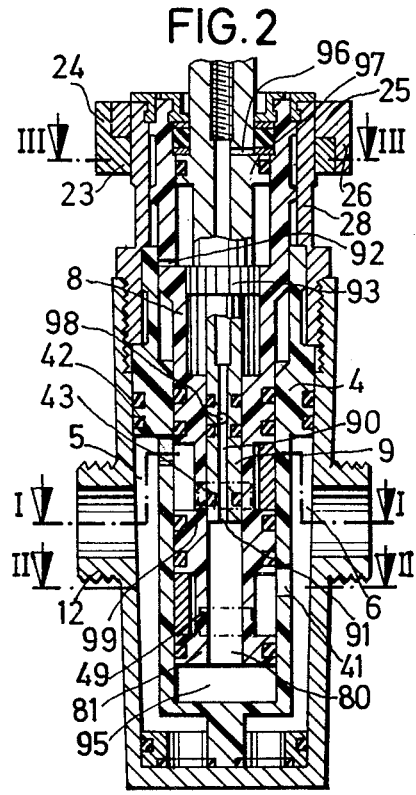
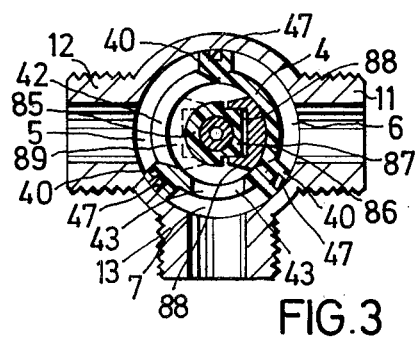
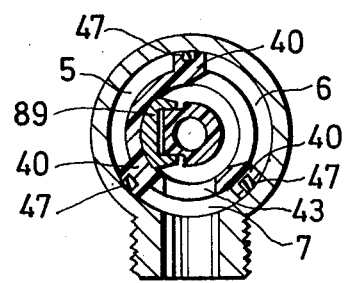
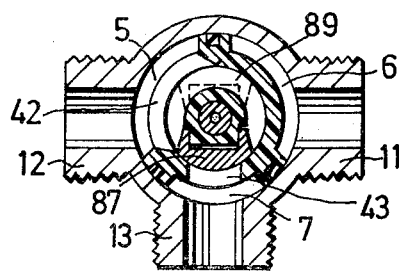
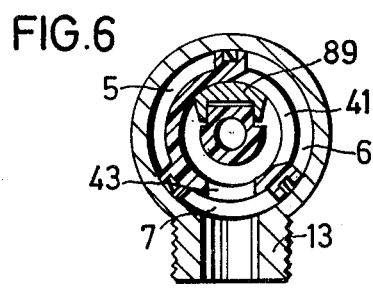

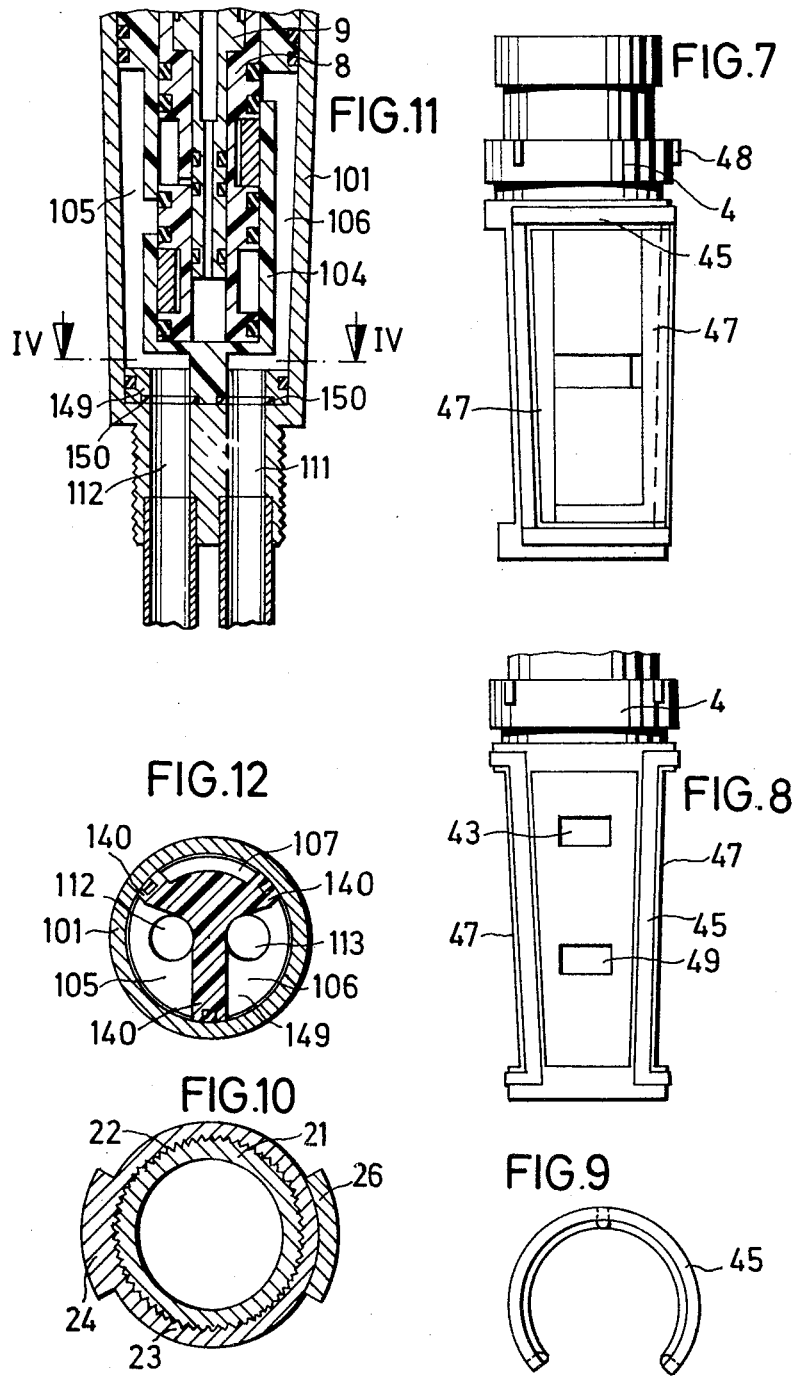

MIXING FAUCET

The present invention relates to a mixing faucet for sanitary installations with a mixing bushing which is mounted in a sealed housing wherein a multi-stage pressure balanced control piston can be displaced within the mixing bushing and acts axially from the outside, so as to open and close the water outlet opening.

In such known mixing bushings, the quantity of outflowing water, as well as the temperature of the mixed water is controlled by a pull or pressure and by the turning of a single handle.

In a known embodiment the mixing chamber is formed in the mixing bushing. By turning the mixing bushing, the inlet opening for the cold and hot water are alternately closed or opened. When pulling the control piston, the inlet openings to the mixing bushing are released. In this known embodiment, the danger exists that after opening of these inlet openings, lateral flow may be created due to tolerance zones which, for example, result in hot water flowing into the cold water despite the closing of the hot water inlet opening in the housing. These known mixing faucets are also disadvantageous in that they do not sufficiently control the water quantity.

It is therefore an object of the invention to provide a mixing faucet of the above mentioned type wherein the different water inlet chambers are constantly separated from each other and with such a structure a fine control is made possible.

This object of the invention is obtained by providing a mixing faucet which is characterized by a control piston which is displaceable in the mixing bushing. Two segment slides are positioned between two pistons, whereby the segment slides alternately open and close the radial outlet openings which are located in an axial riection in the mixing bushing, the outlet openings being for cold and hot water and extending into the mixing chamber.

In accordance with a preferred embodiment of the invention, an outer control bushing is provided having three longitudinal ribs and a corresponding seal, whereby three closed chambers are formed between the sealed ribs and the housing, namely, a cold water chamber, a hot water chamber and a mixing chamber which is in connection with the outlet opening in the housing.

In a further embodiment of the mixing faucet of the invention, segment slides in the form of cylindrical segments are provided together with two lateral ribs, by which the slides are slightly pivotably mounted on a seat between two pistons of the multistage control piston, whereby the segment slides are moved outwardly and pressed against the inner wall of the mixing bushing when water pressure is admitted.

In such a construction the different chambers are sealed axially as well as in a tangential direction to each other, so that no lateral flow can occur. In this construction, the two outlet openings in the mixing bushing, which lead into the mixing chamber, are controlled. Hot and cold water are separately controlled with respect to temperature and quantity. These slightly pivotable segment slides which are self closing when water pressure is admitted are of particular advantage.

In order to obtain an easy movement during the axial displacement of the control piston and a fine control, a hollow control piston is provided, wherein a multistage hydraulic piston coupled with the control piston is displaceable from the outside, the hydraulic piston being provided with a continuous axial bore connecting a rear liquid pressure chamber and a front liquid pressure chamber at the piston. A piston having a larger piston face operates in the front liquid pressure chamber, in such a way that when pulling the axially displaceable hydraulic piston in the control piston, the control piston is also displaced in a pulling direction due to the water pressure in the pressure chamber and due to the hydraulic reduction between the faces of the two pistons. In view of the hydraulic reduction the opening movement of the mixing faucet is facilitated. A fine control is also made possible, because when displacing the hydraulic piston and the rotating and pulling knob which is fixedly connected therewith, the control piston is displaced at a lesser degree.

In a further embodiment of the invention an adjustable rotating limit is provided for a rotary knob which is connected with the control piston. For this purpose, a bushing is mounted in the front opening having an outer knurled area on which two rings are mounted which have corresponding inside knurls and which are provided with two outwardly extending abutment segments which the rotary knob engages with inwardly extending segments, when rotating the knob in a certain angular range. In this manner certain maximum proportions can be maintained which prevent, for example, too hot water from exiting the faucet. Such temperature limitations are already the law in some countries.

Other objects and features of the present invention will become apparent from the following detailed description when taken in connection with the accompanying drawings which disclose several embodiments of the invention. It is to be understood that the drawings are designed for the purposes of illustration only, and are not intended as a definition of the limits and scope of the invention disclosed.

In the drawings wherein similar reference numerals denote similar elements throughout the several views:

FIG. 1 is a longitudinal sectional view through a mixing faucet in the closed position of the control piston;

FIG. 2 is a corresponding sectional view in the open position of the control piston;

FIG. 3 is a sectional view taken along the lines I—I of FIG. 2 in a mixing position when the hot water, as well as the cold water flow in full quantity into the mixing chamber;

FIG. 4 is a sectional view taken along the lines II—II of FIG. 2 at a corresponding mixing position;

FIG. 5 is a sectional view taken along the lines I—I, when the control piston is a 90° angle and wherein the hot water outlet opening to the mixing chamber is closed;

FIG. 6 is a sectional view in the same position taken along the lines II—II of FIG. 2;

FIG. 7 is a longitudinal view of a mixing bushing;

FIG. 8 is a 90° displaced view of mixing bushing according to FIG. 7, and partially broken away;

FIG. 9 is a plan view of a form seal;

FIG. 10 is a sectional view taken along the lines III—III of FIG. 2;

FIG. 11 is a longitudinal view through a different embodiment of the mixing faucet; and FIG. 12 is a sectional view taken along the lines IV—IV of FIG. 11.

First referring to FIGS. 1–9, a conical housing 1 for the mixing faucet is tapered at its inside and contains a cold water inlet socket 11, a hot water inlet socket 12 and a mixed water outlet socket 13. In this conical housing, a correspondingly conically shaped sealed mixing bushing 4 is inserted which may be provided with outer shoulders to avoid accidental turning. These shoulders engage corresponding grooves on the inside of housing 1. Essentially, this mixing bushing 4 may be made of a corrosion and heat resisting plastic material. Three ribs 40 are provided on the outside of the mixing bushing and a form seal 45 is inserted in the sealing ribs 47 thereof being mounted in corresponding grooves in ribs 40. Three chambers 5, 6 and 7 which are sealed against each other are formed between the sealed ribs 40 and the inner wall of the housing 1. The inlet socket 12 discharges into water inlet chamber 5. In chamber 5, the mixing bushing is provided with an inlet opening 42 which discharges into the inside of bushing 4. The cold water inlet socket 11 discharges into the cold water inlet chamber 6. Here too, an inlet opening 41 is provided in the wall of the mixing bushing 4. As can be seen from FIG. 8, the outlet openings 43 and 49 discharge into the mixing chamber 7 and are positioned in an axial direction and in series with each other in the wall of the mixing bushing 4. Through opening 43, hot water discharges into the mixing chamber 7 and cold water discharges into the mixing chamber through the opening 49. The mixed water outlet socket extends in the housing 1 from the mixing chamber 7.

The sealed control piston 8 which is guided in the mixing bushing 4 is preferably made of plastic material and comprises an end piston 81, a center piston 82 with two piston faces, and a piston 83. All piston faces are of equal size. The entering water always enters two opposite piston faces, so that control piston 8 is always balanced with respect to the water pressure. When pulling control piston 8, as shown in FIG. 2, the zone between piston 81 and 82, or 82 and 83, respectively, is pulled in front of the outlet opening 41 and 42, respectively, within mixing bushing 4. Seats 86 are provided for cylinder segments slides 87 or 89, respectively, on the connecting elements 84 and 85 between the pistons 81 and 82, and 82 and 83, respectively. Segment slides 87 and 89 have two lateral ribs 88 and are clamped with these ribs on seats 86. On this seat the segment slides have a clearance which permits a slight pivotal movement. When such a segment slide 87 or 89, respectively, is laterally admitted by water pressure, the slide is positively pressed against the inner wall of the mixing bushing in sealing engagement.

As can be seen from the figures, the two segment slides 87 and 89 are positioned opposite each other and alternately control the two outlet openings 43 and 49 to the mixing chamber by turning control piston 8. In the axial position of the control piston 8, as shown in FIG. 7, the temperature can be controlled by turning the control piston, whereby the hot water outlet opening 43 and the cold water outlet opening 49 are alternately closed or opened.

A hydraulic piston 9 is guided in a continuous axial bore 80 of control piston 8, and is rotatably controlled and coupled therewith, whereby the hydraulic piston is provided with a knurl 93 and corresponding recesses in control piston 8. At the end of hydraulic piston 9 which extends from housing 1, a rotary and pulling knurl 3 is mounted by means of a screw 30. When turning knob 3, the hydraulic piston 9 and the control piston 8 are displaced.

A continuous axial bore 90 is provided in the hydraulic piston 9, which is sealingly closed by screw 30. Bore 90 connects the liquid pressure chamber 95 with the liquid pressure chamber 94. Piston 97 which has a larger face than the piston end 91 is effective in the pressure chamber 94. When the hydraulic piston is pulled out by means of the knob 3, liquid is pressed into the pressure chamber 94 through the lateral bore 96 and the axial bore 90 into the pressure chamber 95, due to the pressure of piston 97. During this movement of the hydraulic piston 9, only a small space is formed in the pressure chamber 95, so that an increase in pressure takes place which actuates a displacement of the control piston 8 in a pulling direction. The water pressure 95 presses against the end face of the piston 81. In this way, a relatively large path of travel by hydraulic piston 9, and a relatively short path of the travel by the control piston 8, occurs, which permits a fine control of the quantity of water entering the mixing bushing through openings 41 and 42.

Furthermore, a hydraulic piston 9 is individually coupled in the longitudinal direction with the control piston 8. When pulling the hydraulic piston, the piston with its associated piston 97 engages a sealed abutment ring 32 which is held in position by a snap ring 33 in piston 8, and pulls the piston 8 after travelling two-thirds of its path. When the hydraulic piston is returned to its basic position, piston 97 engages an abutment shoulder 80a in the control piston 8. In order to fill pressure chambers 90, 94 and 95 of the hydraulic means, a lateral bore 99 is provided in the control piston 8, whereby this bore is passed by an O-ring which is located at the end of hydraulic piston 9, when pulling the hydraulic piston arrangement. When the hydraulic piston 9 is pulled, water can enter into the pressure chamber 95 through the bore 99 from the water inlet chamber 5. A further lateral bore 98 is provided in the hydraulic piston 9 for venting pressure chambers 90, 94 and 95. In the closed position, bore 98 is connected with the chamber 5 through bore 99. If excess pressure occurs in the pressure chambers 90, 94 and 95, eventual trapped air escapes as indicated above. The venting can be obtained by a repeated movement of the hydraulic piston 9.

In the open side of housing 1, a bushing 2 is screwed in, which bushing has an outwardly extending cylindrical portion 21. The cylindrical portion 21 is provided with a knurl 22. Two rings 23 and 25 are mounted on the knurl 22, whereby these rings are provided with outer segments 24 and 26. Due to the knurl, both rings may be mounted on the bushing 2 at any given displaced (offset) position with respect to each other. The rotary and pulling knob 3 covers this arrangement.

At the inside of the knob 3, an abutment 31 is provided which, when rotating knob 3, engages a segment 24 or 26, thus limiting the rotary angle thereof. Due to suitable adjustments of segments 24 and 26 with respect to each other, certain mixing positions may be adjusted which are predetermined by control piston 8.

The invention permits housing structures wherein the supply openings may be arranged laterally or located below the housing. In FIGS. 11 and 12, a construction is shown, wherein the water inlet sockets 111 and 112 are provided at the lower side of the housing 101. At the inlet side, the mixing bushing 104 is provided with a plate 149 with corresponding bores which are sealed with O-rings 150. Between the mixing bushing 104 and the ribs 140, there are formed, the hot water inlet chamber 105, the cold water inlet chamber 106 and the mixing chamber 107. The function of the mixing bushing and the pistons 8 and 9 is the same as in FIGS. 1–9.

While only several embodiments of the present invention have been shown and described, it will be obvious to those skilled in the art that many changes and modifications may be made thereunto without departing from the spirit and scope of the invention.

I claim:
1. Mixing faucet for sanitary installations comprising:
    a sealed housing defining a mixing chamber and a water outlet;
    a mixing bushing having hot and cold outlet openings disposed radially in axial direction adjacent said mixing chamber and being mounted in said sealed housing;
    a multistage pressure balanced control piston means being displaceable within said mixing bushing for opening and closing said water outlet, said control piston including three tandem interconnected pistons; and
    two segment slide means each positioned between different adjacent two of said three pistons, respectively, said segment slide means for alternately opening and closing said hot and cold outlet openings for hot and cold water in said mixing bushing, said hot and cold outlet openings discharging into said mixing chamber.
2. The mixing faucet according to claim 2, wherein: said mixing bushing constitutes an outer conical mixing bushing having three longitudinal ribs, and
    a seal shaped corresponding to said ribs and operatively engaging said ribs, forming three closed chambers continuously separated from each other between said ribs and housing, constituting a cold water chamber, a hot water chamber, and a mixing chamber in communication with said water outlet in said housing.
3. The mixing faucet according to claim 1 wherein each of said adjacent two pistons form seats; and
    said segment slide means constitutes cylindrical segments having lateral ribs slightly pivotally mounted on said seats, respectively, between said two adjacent pistons, whereby said slide means are slightly pivotable therein, and said segments are moved outwardly, pressed against an inner wall of said mixing bushing when water pressure is admitted.
4. The mixing faucet according to claim 1 wherein said control piston means is hollow, a multistage hydraulic piston including a first and second piston end is coupled within said control piston and is axially displaceably controlled, said hydraulic piston is formed with a continuous axial bore which connects a first liquid pressure chamber behind said first piston end with a front liquid pressure chamber, said second piston end having a larger piston face than that of said first piston end constituting a hydraulic reduction between the faces of said piston ends and said second piston operates in said front liquid pressure chamber such that by pulling said hydraulic piston in said control piston means, said control piston is also displaced in a pulling direction due to a water pressure in said first liquid pressure chamber and due to the hydraulic reduction between the faces of said first and second piston ends.
5. The mixing faucet according to claim 4 wherein said hydraulic piston has an outer knurl guided in corresponding recesses formed in the inside of said control piston means.
6. The mixing faucet according to claim 6 further comprising a rotary knob adjacent an end of said hydraulic piston, a retaining screw mounting said knob and sealingly mounted in said axial bore in said hydraulic piston.
7. The mixing faucet according to claim 4 wherein said hydraulic piston is coupled relative to the longitudinal direction with said control piston means.
8. The mixing faucet according to claim 7 further comprising:
    abutments operatively disposed in said control piston means; and
    said hydraulic piston is disposed in the path of said abutments and engages the latter during a pulling movement of said hydraulic piston and a return movement of said hydraulic piston into a rest position thereof, simultaneously moving said control piston means.
9. The mixing faucet according to claim 4 wherein a lateral bore is formed in said control piston means, a sealing ring located at an end section of said hydraulic piston passes said lateral bore, said lateral bore communicating with said pressure chambers and said axial bore, whereby liquid can pass therethrough filling said pressure chambers and said axial bore.
10. The mixing faucet according to claim 4 wherein a lateral bore means is formed in said hydraulic piston which connects said axial bore in a closing position with venting chambers for operatively venting said pressure chambers.
11. The mixing faucet according to claim 6 further comprising an adjustable turning limit means for said rotary knob which is connected with said control piston means.
12. The mixing faucet according to claim 11 further comprising a bushing mounted in a front opening of said housing and having an outer knurled area, two rings which have inside knurls corresponding to said other knurled area are mounted on said bushing, said rotary knob has inwardly extending abutment segments, said rings have two outwardly extending abutment segments, means operatively engaging said inwardly extending segments of said rotary knob upon rotating the knob in a predetermined angle range.

* * * * *